Aug. 21, 1923.
J. R. QUIN
1,465,769
COLLAPSIBLE TIRE BUILDING AND FINISHING CORE
Filed Sept. 6, 1922  3 Sheets-Sheet 1
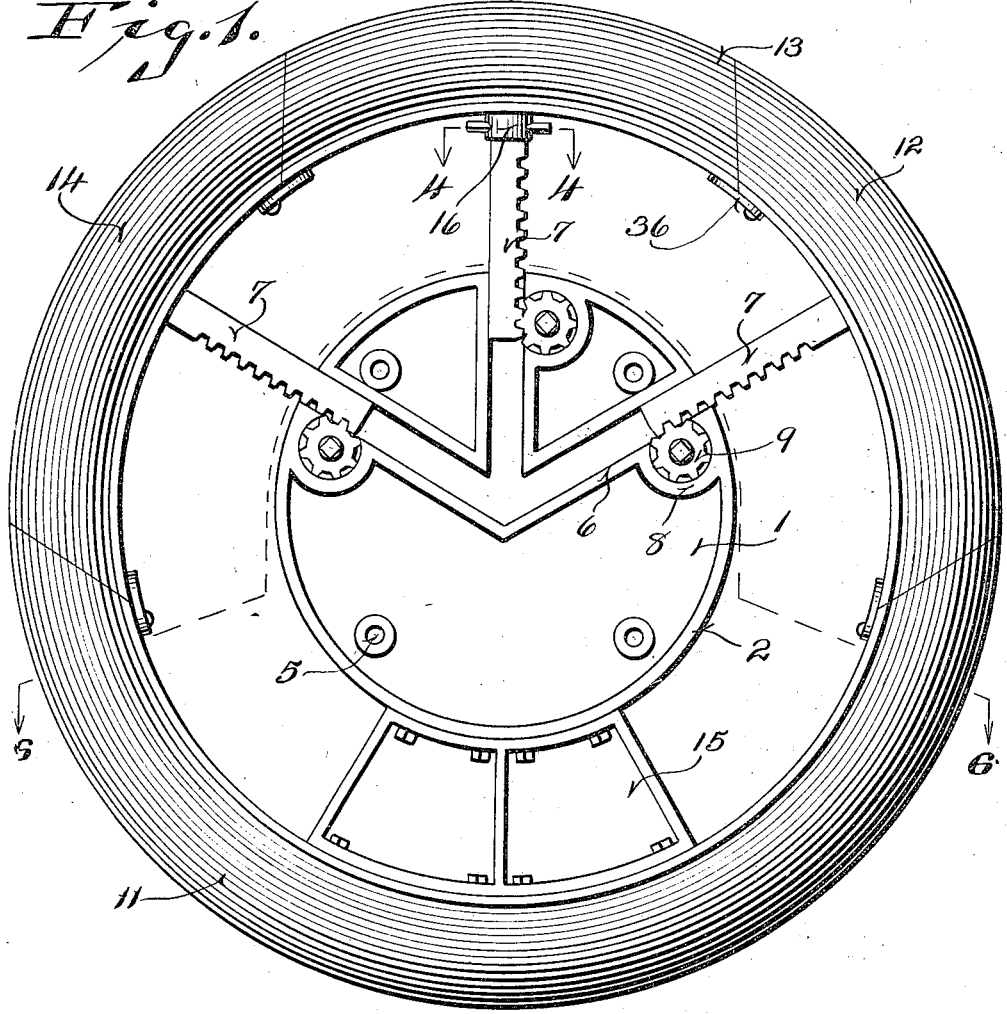
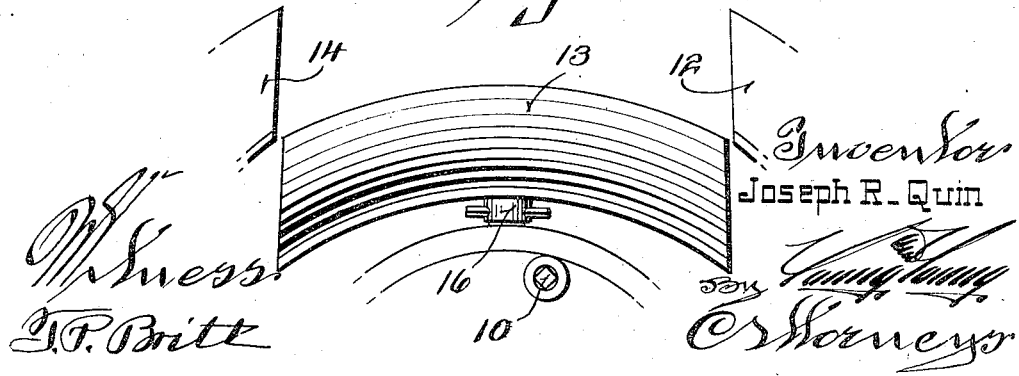
Inventor
Joseph R. Quin Aug. 21, 1923.
J. R. QUIN
1,465,769
COLLAPSIBLE TIRE BUILDING AND FINISHING CORE
Filed Sept. 6, 1922   3 Sheets-Sheet 2
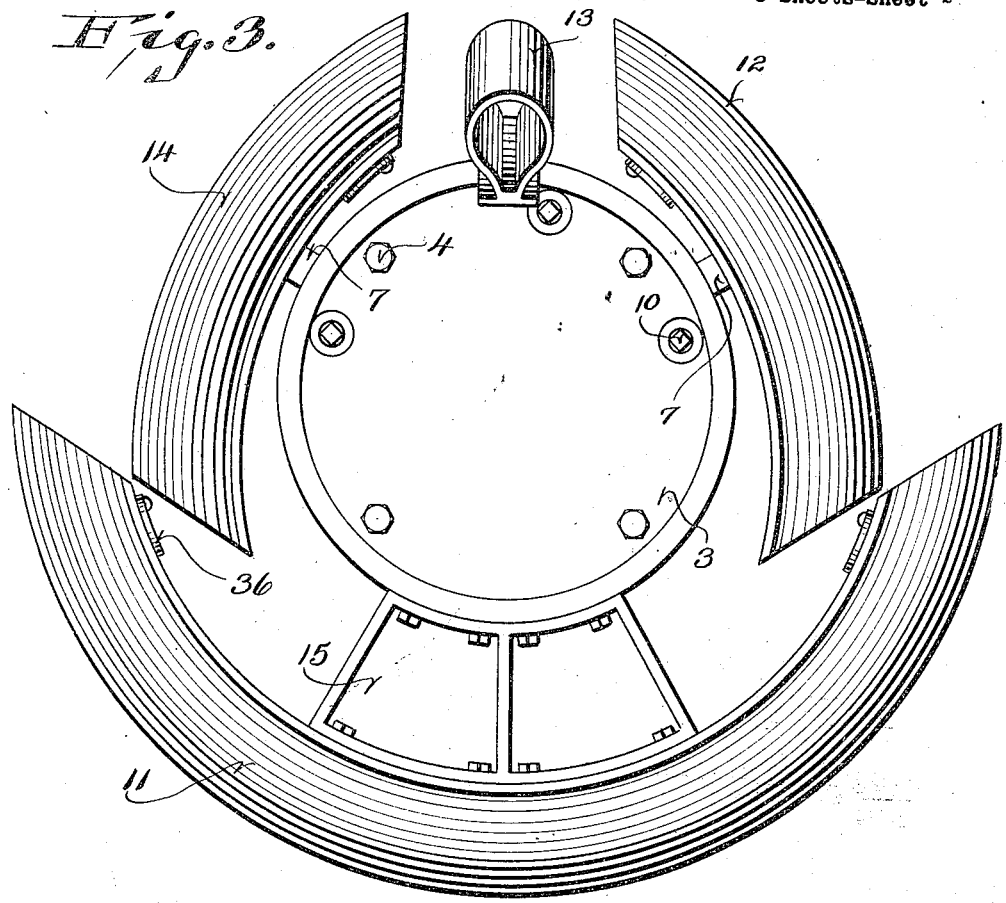
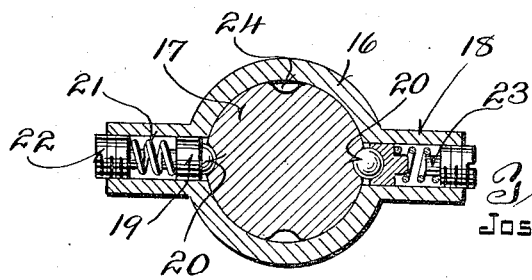
Inventor
Joseph R. Quin Aug. 21, 1923.                                                                   1,465,769
                          J. R. QUIN
            COLLAPSIBLE TIRE BUILDING AND FINISHING CORE
                    Filed Sept. 6, 1922           3 Sheets-Sheet 3
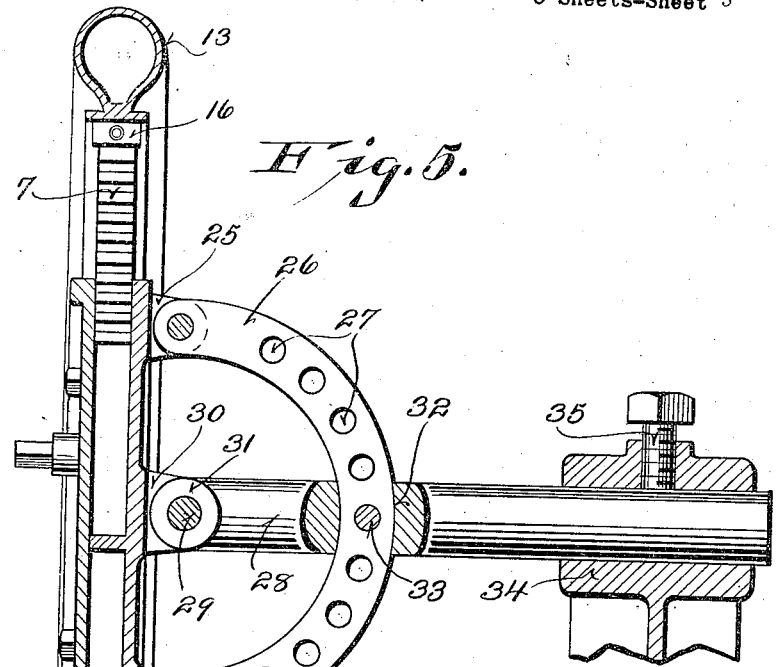
Fig. 5.
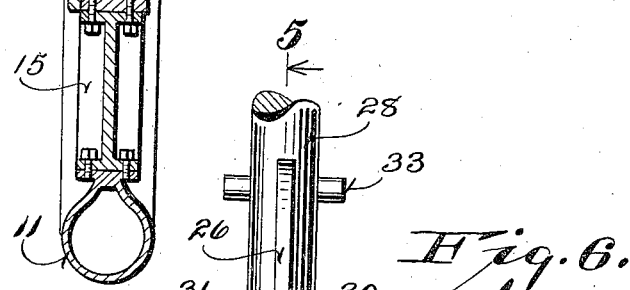
Fig. 6.
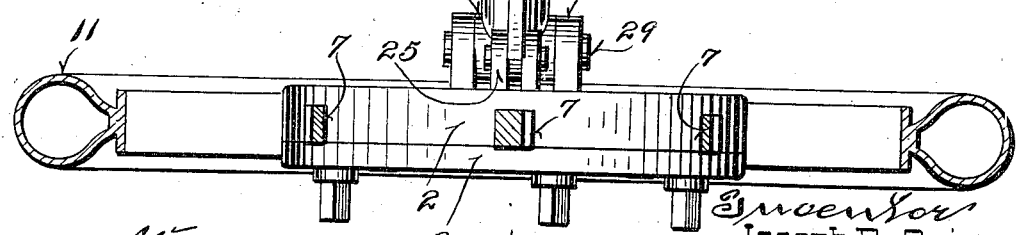
Inventor
Joseph R. Quin Patented Aug. 21, 1923.

1,465,769

UNITED STATES PATENT OFFICE.

JOSEPH R. QUIN, OF CUDAHY, WISCONSIN.

COLLAPSIBLE TIRE BUILDING AND FINISHING CORE.

Application filed September 6, 1922. Serial No. 586,447.

*To all whom it may concern:*

Be it known that I, JOSEPH R. QUIN, a citizen of the United States, and resident of Cudahy, in the county of Milwaukee and State of Wisconsin, have invented certain new and useful Improvements in Collapsible Tire Building and Finishing Cores; and I do hereby declare that the following is a full, clear, and exact description thereof.

This invention relates to collapsible cores adapted for use in the manufacture and finishing of casings such as tires for automobiles.

Heretofore it has been the practice to form the tire upon one core, remove it, and replace it upon a finishing core. This needless complication has been necessary, with former types of cases, primarily because of the relative inaccessibility of certain portions of the tire when mounted upon the core used in its manufacture.

It is therefore a primary object of this invention to provide a core upon which the tire may be both formed and finished without removing the tire from the core.

Further objects are to provide a core which is so mounted that it may be readily tilted to any desired angle, to provide ready access to all sides of the tire, to provide a readily rotated core, and to provide highly serviceable and practical type of core.

Further objects are to provide a core in which the various sections may be readily withdrawn in a simple and effective manner from the tire, to provide simple means for effecting such withdrawal, and to provide a composite core in which most of its parts may be withdrawn without moving them from the plane of the tire.

An embodiment of the invention is shown in the accompanying drawings, in which:—

Figure 1 is a plan view of the core with the upper cap of the body portion removed.

Figure 2 is a fragmentary detail showing the position occupied by one of the core sections in its first or initial movement.

Figure 3 is a plan view of the device with the core sections retracted.

Figure 4 is a sectional view on the line 4—4 of Figure 1, drawn to an enlarged scale.

Figure 5 is a vertical sectional view on the line 5—5 of Figure 6.

Figure 6 is a sectional view on the line 6—6 of Figure 1.

The device comprises a body portion which may be a hollow cylindrical member having a closed end 1, a circular wall 2, and a removable end or cap 3. The end may conveniently be retained by a plurality of bolts 4 threaded into bosses 5, extending upwardly from the end portion 1. A plurality of radially arranged guide-ways 6 are formed integrally with the end 1 and sides 2 and serve to guide racks 7. A plurality of circularly recessed casings 8 are provided adjacent, and opening into, the guide-way 6 and are designed to house pinions or gears 9, such pinions being rigidly attached to spindles which project outwardly from the body portion, preferably through the end 3. The spindles are provided with square ends 10 by means of which they may be rotated, as for example by a similarly apertured crank.

The core proper comprises a plurality of sections 11, 12, 13, and 14. The section 11 may be rigidly supported from the body portion by means of a bracket 15 bolted respectively to such section and to the body portion. The sections 12 and 14 are rigidly attached to their respective racks and are adapted to be moved directly radially inwardly. The section 13 is pivotally joined to its rack in any suitable manner, as for example by means of a sleeve 16 slidably locked to a circular portion 17 of the rack.

The sleeve 16 may conveniently be provided with outwardly projecting hollow ears 18, within which are slidably held plungers 19 which carry balls 20 at their inner ends, as shown in Figure 4. These plungers are adapted to be spring pressed inwardly by means of helical springs 21 bearing at one end against the plunger and at the other end against adjustable stops 22 threaded into the hollow ears 18—suitable projections 23 being preferably formed upon the plungers and stops and adapted to center the springs 21. These balls 20 are adapted to seat within recesses 24 formed within the circular portion 17 of the rack and to temporarily lock the section 13 of the core in either one of two angular positions, as shown in Figures 1 and 3.

The body portion is provided with a plurality of lugs 25, between which is attached an annular member 26 provided with a plurality of apertures 27. A revolubly mounted standard 28 is pivoted to the body portion by means of a pin 29 passed through relative widely spaced lugs 30 and through an enlarged portion 31 formed upon the standard 28. The standard is slotted, as indicated at 32, and is adapted to slidably receive the arcuate member 28. It is provided with an aperture at right angles to the slot and adapted to aline with any one of the apertures 27. A pin 33 is adapted to be passed through the alined apertures to thereby lock the arcuate member to the standard—thus providing means for locking the core in any desired angular position. The standard may be mounted in a horizontal position within any suitable support 34 and may be locked in any convenient manner, as by means of a set screw 35 threaded through such support and bearing against the standard 28.

The operation of the device is as follows:—

After the tire has been formed upon the core, an angular setting may be given the device and the core may be locked in its angular position by means of the pin 33. In this position the operator may have ready access to the tire, particularly the sides thereof, as the core may be angularly tilted in any desired position. Heretofore it has been necessary to remove the tires from the moulds and place them upon other finishing moulds. This, however, is entirely avoided by the invention herein outlined, as the tire may be left upon the mould and may be finished without removing it from such mould. When it is desired to remove the tire from the mould, the section 13 is first retracted by rotating its appropriate gear—the pivotally mounted retaining clips 36 having been first removed out of the way.

After the core section 13 has been moved inwardly a sufficient distance, as indicated in Figure 2, it may be rotated to the position shown in Figure 3. Thereafter the sections 12 and 13 are moved inwardly by their racks and pinions. The tire may then be readily removed from the section 11.

It will be seen that a mould has been provided for a tire, in which the entire operation of forming and finishing a tire may be performed while the tire is upon the mould, without necessitating its removal therefrom. It will also be seen that an extremely simple and efficacious device has been provided, whereby the several sections of the mould may be moved directly inwardly without rocking them or angularly displace them from the plane of the core.

It will also be seen that adequate clearance is provided by pivotally mounting one of said sections and providing for its rotative movement after it has been retracted directly inwardly.

I claim:—

1. A core for a tire comprising a core portion, a body portion from which said core portion is supported, a revolubly mounted standard pivotally joined to said body portion, a curved member joined to said body portion and slidably associated with said standard, and means for locking said member and standard together.

2. A core for a tire comprising a body portion, a core proper supported therefrom, an apertured arcuate member secured to said body portion, an apertured standard pivotally joined to said body portion, and means adapted to cooperate with the apertures in said arcuate member and standard whereby said core may be held with its central plane at any desired angle to the axis of said standard.

3. A core for a tire comprising a body portion, a core proper carried therefrom, a revolubly mounted standard pivotally joined to said body portion and having a slot therethrough and an aperture at right angles to said slot, an arcuate member secured to said body portion and slidably received in said slot and having a series of apertures adapted to aline with the aperture in said standard, and a pin adapted to pass through such alining apertures, whereby said core is adjustably held both angularly and revolubly.

4. A collapsible annular core comprising a plurality of relatively movable core sections, a body portion located within the outline of said core sections, a plurality of racks secured to said core sections and slidably held within said body portion, and a plurality of pinions adapted to retract said racks and draw the core sections into disengaged position, one of said sections being pivotally joined to its corresponding rack and adapted to rotate about an axis extending radially through said section.

5. A collapsible tire core comprising a plurality of core sections, a body portion rigidly secured to one of said sections, a plurality of racks secured to the remaining core sections and slidably carried by said body portion, gears carried by said body portion and meshing with said racks, one of said racks being pivotally joined to its corresponding core section, and means for temporarily retaining said section in any one of several angular positions relatively to its rack.

In testimony that I claim the foregoing I have hereunto set my hand at Milwaukee, in the county of Milwaukee and State of Wisconsin.

JOSEPH R. QUIN.